United States Patent

[11] 3,560,823

| [72] | Inventor | Arne M. Nystuen<br>Stevensville, Mich. |
|---|---|---|
| [21] | Appl. No. | 774,050 |
| [22] | Filed | Nov. 7, 1968 |
| [45] | Patented | Feb. 2, 1971 |
| [73] | Assignee | Whirlpool Corporation<br>a corporation of Delaware |

[54] LOW PROFILE MOTOR PUMP STRUCTURE
6 Claims, 3 Drawing Figs.

[52] U.S. Cl. .................................................. 318/221,
310/267, 318/225
[51] Int. Cl. .................................................. H02p 1/44
[50] Field of Search ........................................ 310/267,
268; 318/220, 221, 222, 223, 225

[56] References Cited
UNITED STATES PATENTS

| 541,604 | 6/1895 | Eickemeyer | 318/222 |
| 2,779,907 | 1/1957 | Hutchins et al. | 318/221X |
| 2,842,729 | 7/1958 | Hillman | 318/222X |
| 2,864,986 | 12/1958 | Hutchins et al. | 318/221X |
| 3,476,054 | 11/1969 | Gangloff | 310/268X |

Primary Examiner—Oris L. Rader
Assistant Examiner—Gene Z. Rubinson
Attorney—Hofgren, Wegner, Allen, Stellman & McCord ABSTRACT: A yoke wound motor structure. The motor is adapted, as a result of its low profile, for facilitated installation such as in dishwasher applications. A pump is provided within the housing to form a compact motor-pump assembly. The toroidal yoke winding includes a portion arranged to provide a flux differing in phase from the flux generated by the main portion of the yoke winding during starting of the motor. The rotor may be a conventional squirrel cage rotor.

3,560,823

LOW PROFILE MOTOR PUMP STRUCTURE

BACKGROUND OF THE INVENTION

1. Field of the Invention

This invention relates to yoke wound motors, and in particular, to yoke wound motors adapted for use in applications such as dishwasher pump applications.

2. Description of the Prior Art

One known form of electric motor comprises a yoke wound motor wherein the stator coil is wound toroidally about the stator yoke whereby a reduction in the amount of wire necessary for winding the motor is obtained.

SUMMARY OF THE INVENTION

The present invention comprehends an improved yoke wound motor adapted for use in applications such as dishwasher pump applications. Illustratively, the motor of the present invention may comprise a two pole, split-phase motor having a pump integrally associated therewith. Means may be provided for selectively effecting the split-phase operation during starting of the motor. The use of the yoke wound stator provides a low profile which, in conjunction with the integrally associated pump, provides an improved axially short, compact motor-pump assembly for facilitated installation in applications such as dishwashers. To facilitate winding of the stator, the core may be split into two half portions, with each half portion being wound separately. The two halves are then joined to form a ring.

More specifically, the invention comprehends an improved motor structure including an annular stator, a toroidal winding on the stator, and a rotor coaxially rotatable within the stator and adapted to be inductively rotated as an incident of flux generation by an alternative current flow in the stator winding, wherein the stator winding defines a two pole stator inductor and means for causing a current in a first portion of the stator winding to differ in phase from the current in a second portion thereof for effecting a split-phase starting condition.

Further, more specifically, the invention comprehends such a motor structure wherein the means for causing a phase difference comprises means for causing current flow through the first portion to be operated solely be inductive coupling thereof to the second portion.

Still further, the invention comprehends, more specifically, such a motor structure wherein the means for causing a phase difference comprises means for selectively shorting the first portion of the stator winding.

Further, the invention more specifically comprehends such a motor structure for causing the flux developed by the shorted first portion to lag the flux developed by the second portion. The means causing the phase difference may be arranged for shorting the first portion of the stator winding only during the starting portion of the motor operation.

Further, the invention more specifically comprehends such a motor structure wherein the shorting means comprises a current relay having a coil in series with the second portion of the stator winding and a normally open switch controlled by the coil for shorting the first portion during the starting portion of the motor operation.

The invention more specifically comprehends providing the second winding portion with spaced sections at opposite ends of the first winding portion.

BRIEF DESCRIPTION OF THE DRAWINGS

Other features and advantages of the invention will be apparent from the following description taken in connection with the accompanying drawings wherein.

DESCRIPTION OF THE PREFERRED EMBODIMENTS

Figure 1:
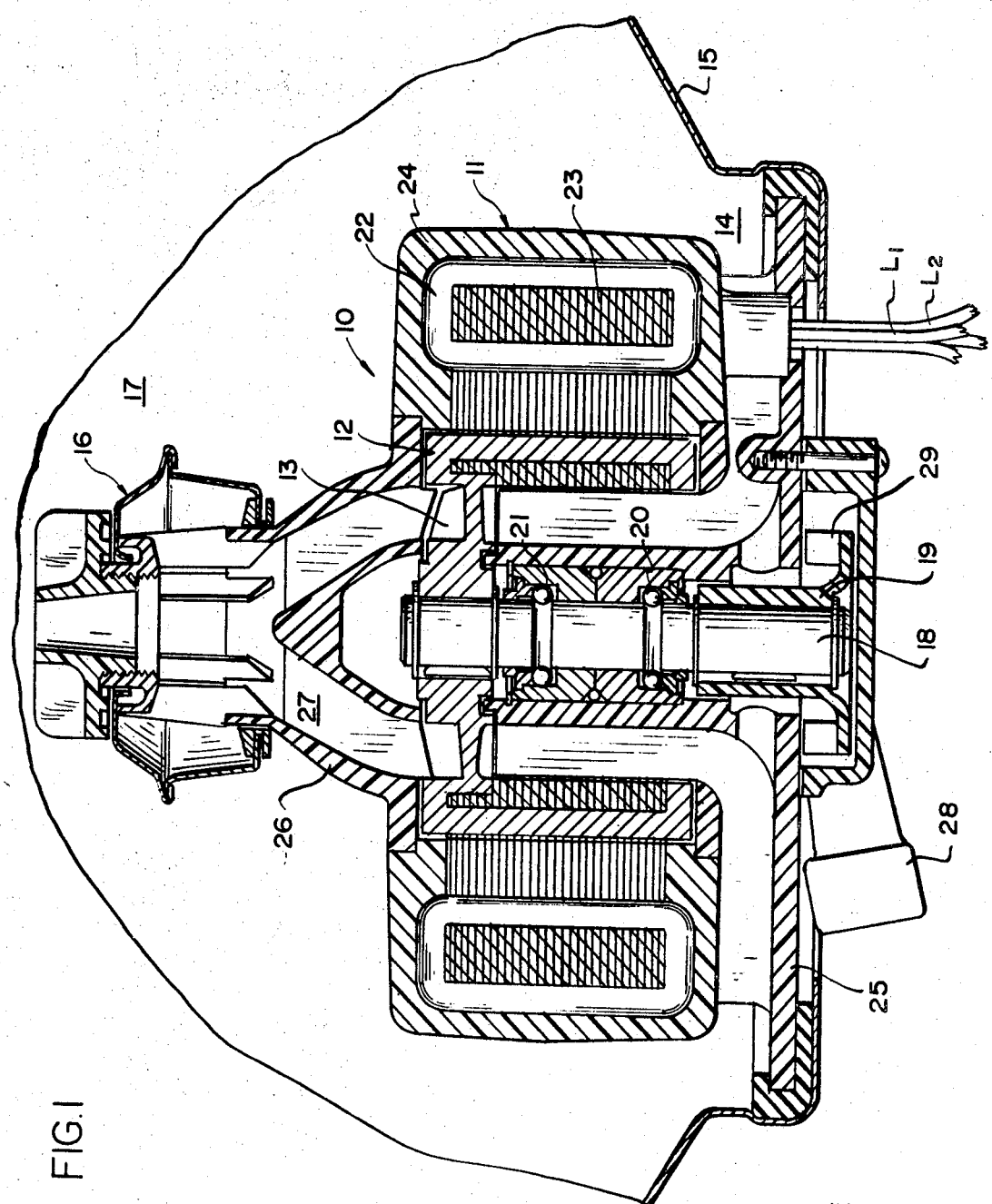
FIG. 1 is a diametric section of a motor structure embodying the invention installed in a dishwasher.
Figure 2:
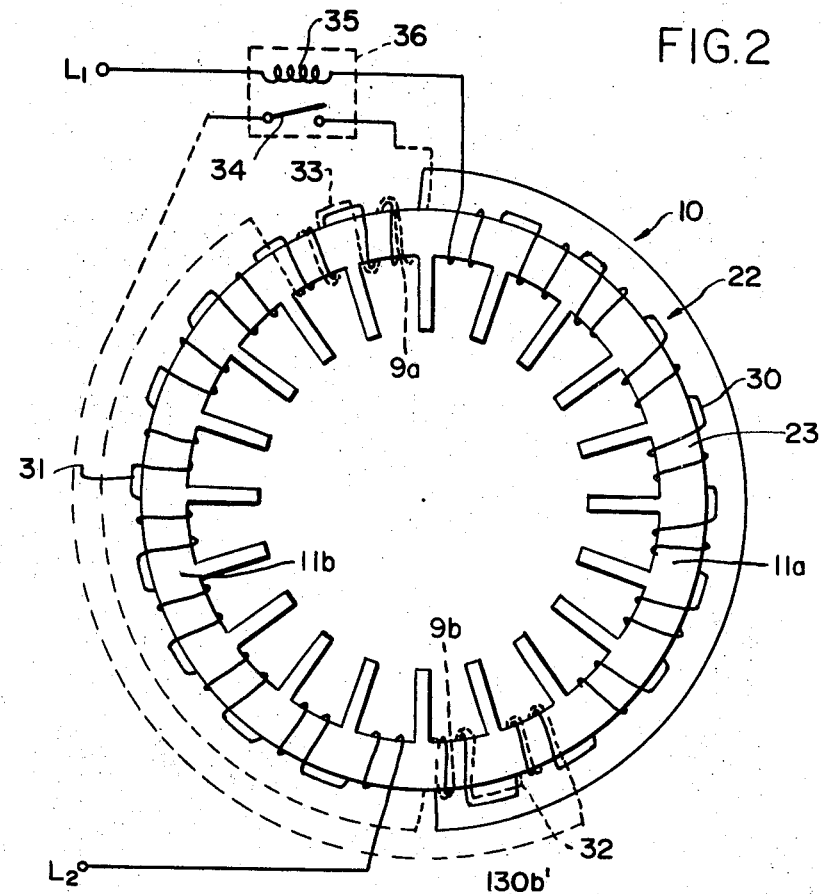
FIG. 2 is a schematic wiring diagram illustrating the winding arrangement of the motor.

In the exemplary embodiment, as disclosed in FIGS. 1 and 2 of the drawing, a single phase yoke wound motor, generally designated 10, is shown to comprise a stator 11 and a rotor 12 coaxially assembled with a pump 13 for pumping a fluid, such as water, from a sump 14 of a dishwasher tub 15 through a discharge device 16 as for spray-washing dishes, and the like, in a washing chamber, generally designated 17, further defined by the tub 15.

The stator 11 may comprise a core which is split at 9a, and 9b, approximately 180° apart, into half portions, 11a and 11b, to facilitate winding of the stator. The two halves are assembled into a ring as illustrated in FIG. 2 for motor operation.

The rotor 12 is carried on a shaft 18 journaled in suitable bearings 19, 20 and 21, the pump 13 being carried on the upper end of the shaft 18, as best seen in FIG. 1. The rotor 12 may comprise a short-circuited conventional squirrel cage rotor inductively coupled to the main stator yoke inductor windings 22 which may be suitable electrically energized from power supply leads L1 and L2. The motor 10 may be hermetically sealed for submersed operation with the yoke 23 and yoke windings 22 encased in a suitable body of plastic 24. The motor 10 may include a base plate 25 and an upper housing portion 26 defining a pump chamber 27.

A drain outlet 28 may be provided for directing the liquid outwardly therethrough from the tub 15 as a result of a reverse rotation of the motor, there being a drain pump 29 mounted on the lower end of shaft 18 for effecting the drain operation upon such reverse rotation.

The present invention comprehends the provision of such a yoke wound motor 10 comprising a two pole, single phase motor having a first stator pole main winding 30, a second stator pole main winding 31, a first stator phase-shift winding 32, and a second stator phase-shift winding 33 wound toroidally on an annular stator yoke 23. As shown in FIG. 2, the main stator winding portions 30 and 31 are connected in series across the power supply leads L1 and L2 and the phase-shift windings 32 and 33 are connected in series with a normally open switch 34 controlled by a current coil 35 of a relay 36, the coil 35 being connected in series with the main windings 30 and 31 for closing switch 34 during starting of the motor 10 as a result of the high current condition obtaining at that time.

When the motor reaches sufficient speed, the current decreases through coil 35 and permits the switch 34 to open the circuit to the phase-shift windings 32 and 33.

It has been found that with the arrangement of the stator winding 22, as shown in FIG. 2, the shorting of winding portions 32 and 33 has little effect on the current in the main winding portions 30 and 31, thereby providing an improved split-phase motor operation. The relay 36 may comprise a conventional current relay as a result of the novel arrangement of the coil in the main stator winding circuit as a result of the low coupling factor.

Figure 3:
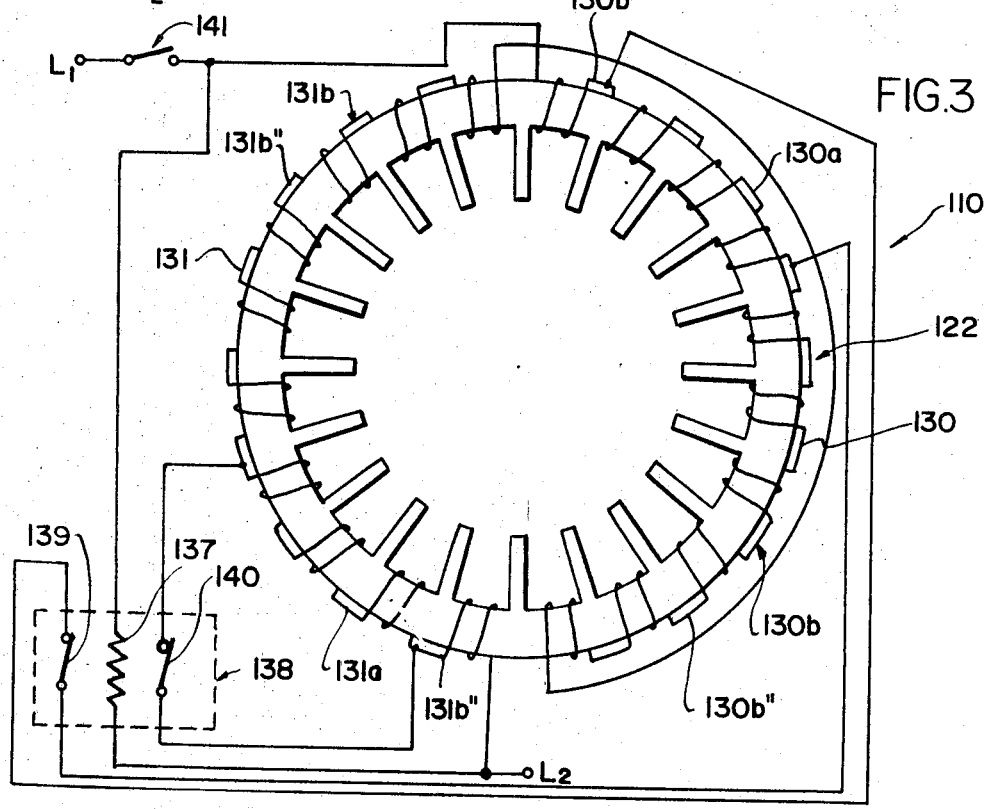
FIG. 3 is a schematic wiring diagram illustrating the winding arrangement of another form of such a motor.

Referring now to FIG. 3, a modified form of motor, generally designated 110, is shown to comprise a motor generally similar to motor 10, but having a modified form of stator winding, generally designated 122. As in motor 10, the stator yoke windings 130 and 131 are connected in series across the power supply leads L1 and L2. In parallel with the stator windings is a heater 137 or a conventional bimetallic thermal switch 138 having normally closed switches 139 and 140 selectively openable as a result of the energization of heater 137 upon closing of the on-off switch 141. Switch 139 is connected across a first portion 130a of the stator winding 130 and switch 140 is connected across a first portion 131a of the stator winding 131. As shown in FIG. 3, the second portions 130b and 131b of windings 130 and 131, termed the main windings, are connected in series with the first portions 130a and 131a respectively, termed the starting windings. More specifically, as shown in FIG. 3, each of the main windings 130b and 131b includes two sections 130b' and 130b'' and 131b' and 131b'' on opposite sides of the respective starting windings 130a and 131a.

Thus, the starting windings 130a and 131a have an electromotive force induced therein by the turns of the main windings 130b and 131b when the switches 139 and 140 are closed to short circuit the starting windings 130a and 131a. The flux of the shorted windings lags the flux of the main windings thereby providing the desired split-phase starting operation of motor 110.

In the embodiment of FIG. 3, the switch 138 comprises a time-controlled switch functioning to open the switches 139 and 140 after a preselected time controlled by the rate of heat development in the heater resistor 137. As will be obvious to those skilled in the art, a current controlled relay, such as relay 36, may be utilized with motor 110, or the time-controlled switch 138 may be utilized with motor 10, as desired. The shorting switches are exemplary only, it being obvious that other suitable switches may be similarly employed.

Illustratively, the motor 10 may have an outside diameter of approximately 6 inches with the stator having an axial dimension of approximately 1¼ inches to provide excellent performance in use as a dishwasher pump motor. In one motor of this type found to provide excellent operating characteristics, the internal diameter of the stator was made to be 3½ inches. The reduction of the end turns required in the conventional wound stator permits a reduction in the wire size. It has been found that aluminum wire may be economically employed in the motor 10.

The motor may be made reversing by suitable shorting starting windings (not shown) at opposite ends of the main windings, as will be obvious to those skilled in the art.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a motor pump structure including an annular stator, a toroidal winding on said stator, and a rotor coaxially rotatable within said stator and adapted to be inductively rotated as an incident of flux generation by an alternating current flow in said stator winding, said stator, stator winding, and motor defining a yoke wound electric motor, the improvement comprising: a pump disposed coaxially within said motor, said toroidal stator winding defining a two pole stator inductor having means for causing a current in a first portion of the stator winding to differ in phase from the current in a second portion thereof for effecting a split-phase starting condition, the axial extent of said toroidal yoke wound stator and pump therein being substantially less than the outside diameter of the motor whereby said motor comprises a low profile motor.

2. The motor structure of claim 1 wherein said means for causing a phase difference comprises means for selectively shorting said first portion of the stator winding, the resistance of said first portion of the winding being high relative to the inductance thereof for causing the flux developed by said shorted first portion to lag by approximately 90° the flux developed by said second portion.

3. The motor structure of claim 1 wherein said first and second stator winding portions are free of electrical connection therebetween.

4. The motor structure of claim 1 wherein said first and second winding portions are serially connected.

5. The motor structure of claim 4 wherein said second winding portion includes a first section at one end of said first winding portion and a second section at the other end of said first winding portion.

6. The motor structure of claim 1 further includes means connected to said pump for spraying washing liquid suitably for washing dishes.